Oct. 5, 1965 R. R. BEAMER 3,209,484
CRAB TRAP

Filed June 10, 1963 4 Sheets-Sheet 1

INVENTOR.
RALPH R. BEAMER
BY
Clarence M. Tuck

Oct. 5, 1965 R. R. BEAMER 3,209,484
CRAB TRAP
Filed June 10, 1963 4 Sheets-Sheet 2
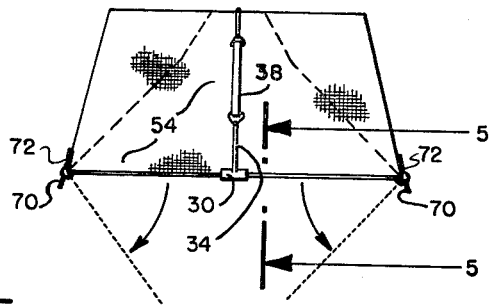
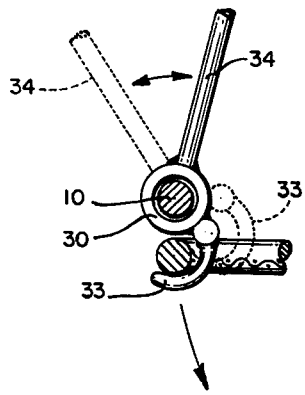
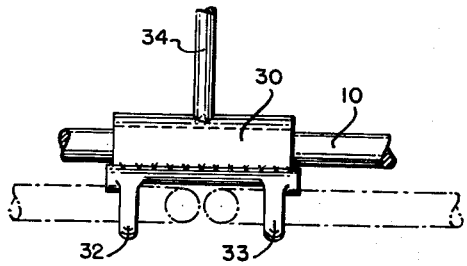
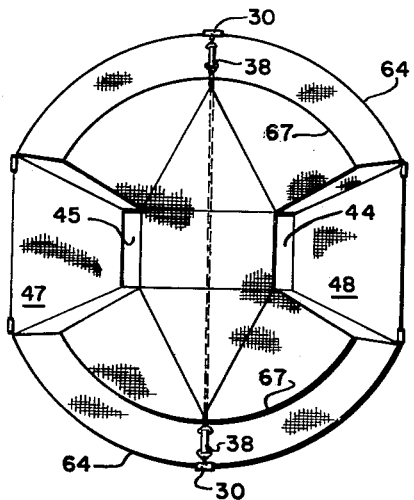
INVENTOR.
RALPH R. BEAMER
BY
Clarence M. Tuck Oct. 5, 1965

R. R. BEAMER 3,209,484

CRAB TRAP

Filed June 10, 1963

INVENTOR.
RALPH R. BEAMER
BY
Clarence M. Tuck

INVENTOR.
RALPH R. BEAMER
BY
Clarence M. Tuck

United States Patent Office 3,209,484
Patented Oct. 5, 1965

3,209,484
CRAB TRAP
Ralph R. Beamer, Homer, Alaska
Filed June 10, 1963, Ser. No. 286,536
7 Claims. (Cl. 43—100)

This present invention relates to the general art of web or netting covered frames which are provided with small tunnels or openings through which crabs can enter, usually attracted by bait within the trap, and in which the crabs, when they are once in the trap, do not readily find their way out again. More particularly this invention relates specifically to a type that is made relatively large in size and which is easily unloaded when the trap is raised after fishing and in which further provision is made so that the traps can be nested in a very compact mass for transportation on the deck of a small fishing boat.

In order to provide a trap that can be practically employed in the taking of king crabs it is necessary to consider the entire problem. For instance, king crabs are normally found in relatively deep off-shore waters which are normally unprotected; consequently the handling of traps under these conditions is a difficult one for the commercial fisherman. In taking the king crab it must be remembered that the crabs are relatively large, having an over-all spread from tip to tip of the longest legs of approximately four feet. It then becomes necessary from a commercial aspect to have a trap of relatively large size so that a goodly number of crabs can be accommodated in a single trap, thus making the venture profitable. The areas to be fished for king crab are almost invariably at a considerable distance from the normal home port or shelter harbor of the fishing boat. Consequently, in order to carry enough of the large traps it is necessary that they be easily nested together and when nested together can be easily taken off one at a time as they are set in their fishing location. The very size of the trap and the desire to have a considerable volume within the trap has made it necessary to employ preferably a welded steel framework so as to give rigidity in a trap that will not be deformed in use to the extent preventing its being nested with many others of a similar type. In this present king crab trap it is believed that the major problems of this industry have been adequately met and that a worthwhile and practical solution is the result.

A principal object of this present invention therefore is to provide preferably a rigidly framed, relatively large crab trap having a general form of a truncated regular pyramid.

A further object of this invention is to provide bottom opening doors so the doors may be held securely in their closed position during the fishing period but when raised above the deck of the tending boat can be easily opened and the crabs taken by the trap, dumped upon the deck or in the hold of the craft.

A further object of this invention is to provide bottom opening doors so arranged that they may be revolved approximately 180 degrees along the bottom margin of their respective sides so that a number of these traps can be nested together so as to make for the safe and convenient handling of the traps.

A further object is to provide a trap embodying the principles of my preferred type but which can be made yieldable or flexible to avoid the force of water currents and wave action when full of crabs.

Further objects, advantages and capabilities will be apparent from the disclosure in the drawings or may be comprehended or are inherent in the device.

In the drawings:
FIGURE 1 is a perspective view, from a top quartering position, illustrating the general form of my trap and showing in dotted lines the open or dumping position of the bottom doors.

FIGURE 4 is a view 90 degrees revolved from FIGURE 3 and showing the hinged means employed to insure the secure closure of the bottom doors of the traps.

FIGURE 5 is a fragmentary view, partly in section and also showing an alternate position of the hook, in dotted lines, and the lever means employed to secure the doors of my trap in their closed position.

FIGURE 6 is a side elevation of the construction shown in FIGURE 5 and more fully illustrating the details of structure. The abutting margins of the two doors of the trap are shown in dot and dash lines.

FIGURE 7 is a modified form of my trap in which the corners have been rounded off to provide, in effect, a round form for my trap.

Figure 1:
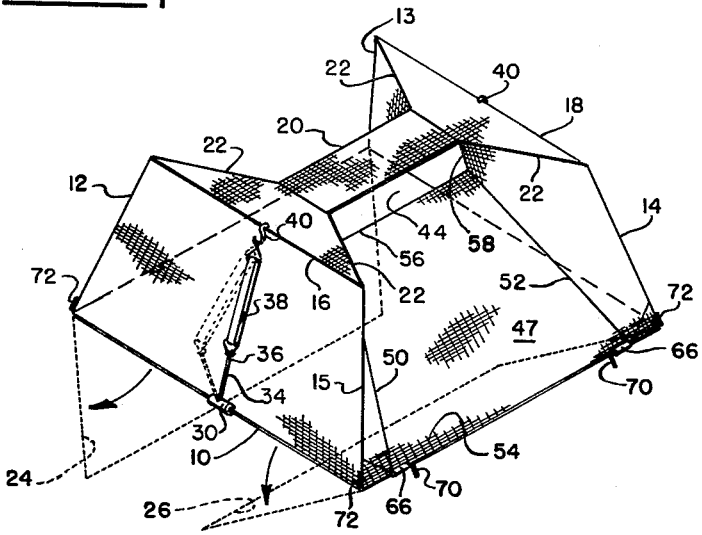
Figure 2:
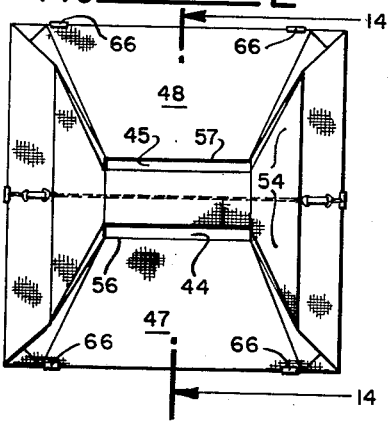
FIGURE 2 is a top plan view of the trap of FIGURE 1.
Figure 3:
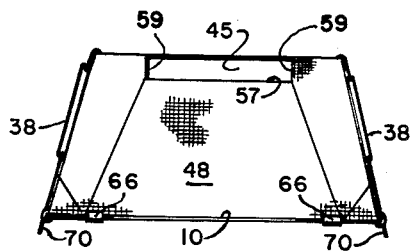
FIGURE 3 is a side elevation showing one of the entrance openings through which the crabs pass in endeavoring to get to the bait within the trap.
Figure 8:
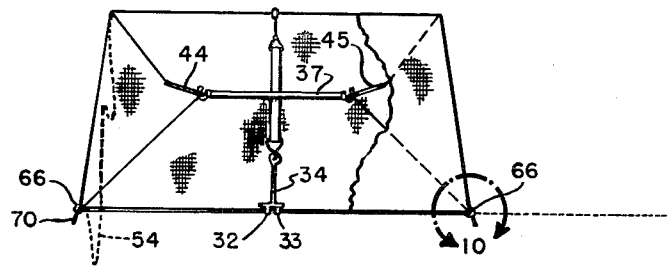
FIGURE 8 is a view taken in the same general sense as FIGURE 4 but showing a modified form of trap so as to illustrate a flexible entrance open end frame of the trap intended for use in strong currents.
Figure 9:
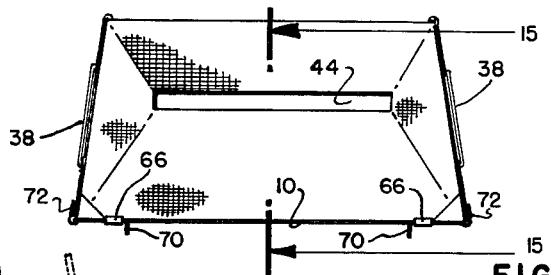
FIGURE 9 is an elevation similar to that of FIGURE 8 but revolved 90 degrees to illustrate the opening through which the crabs are led into the trap.

Referring to the drawings, throughout which like reference numerals indicate like parts, the numeral 10 designates a peripheral frame, preferably welded together so that it is substantially a solid steel bottom frame which will serve as a base upon which to construct the trap. Extending upwardly from each corner of frame 10 and slanting inwardly from the horizontal as they would if the corners were those of a regular pyramid, are the corner frame members 12, 13, 14 and 15. These corner frames are fixedly secured to the bottom frame 10 preferably by welding thereto. Opposite ends of the trap are constructed of upper end frame members 16 and 18. With the generally horizontal frame member 16 interconnecting the upper ends of corner members 12 and 15. Frame member 12 connects corner members 13 and 14 in like manner. These are also preferably steel and are welded to the corner frame members adjacent thereto.

The top of the trap is probably best illustrated in FIGURE 1 wherein it will be noted that there is a rectangular framework at 20 having two opposite pairs of equal sides forming a rectangle with the short sides nearest the upper end frame members as 16 and 18. This rectangle is preferably made of welded steel and is parallel to the plane of bottom frame 10. Joining the corners of rectangle 20 with the corner frame members 12, 13, 14 and 15 are the upper diagonal frame members 22. This framework completes the frame required for structural rigidity and strength and can be made of a steel having a cross section best adapted to this purpose, such as bar rod, tube or other structural shape. It is not contemplated that construction will be limited strictly to steel.

Hingedly secured to the opposite sides of frame 10 by being hinged thereto are the bottom floor doors 24 and 26. These doors are secured together at their opposite ends in the closed position by the structure best shown in FIGURES 5 and 6. A tubular member 30 encircles a portion of the bottom frame 10 approximately in the middle of opposed side members of said bottom frame and is provided with a pair of spaced hooks 32 and 33. Said hooks 32 and 33 are securely attached to the underside of said member 30 and curve downwardly and outwardly. In such an arrangement hooks 32 and 33 pass under the doors and hold them locked until member 30 is rotated to disengage the hooks. An upwardly extending lever 34 is fixedly secured to tube 30, preferably by welding thereto, and is provided at its upper end with a loop 36 as shown in FIGURE 1. A resilient closing member 38 is detachably secured to loop 36. Said closing member 38 may be a tension spring or preferably a strong elastic material such as a loop of rubber as cut from an inner tube. The opposite end of member 38 is secured to the hook 40, one at each end of the trap and secured midway in upper frame members 16 and 18. This provides a closure or locking feature that tends to always restrain the doors 24 and 26 from opening even though the general framework should be rocked and jostled considerably in handling, especially when loaded with crabs.

In order to provide entry into the traps it is desirable that the crabs in seeing bait attached to the floor of the trap, be guided upwardly toward the trap entrance. In order to guide crabs up to and through openings 44 and 45, two ramps 47 and 48 are provided.

Ramp frame members 50 and 52 are rigidly secured to bottom frame 10 on the same opposed sides on which doors 24 and 26 are hinged. Said members are respectively spaced inwardly a short distance from the corners of frame 10 and extend upwardly at an angle to a point spaced slightly below and outwardly of the corners of frame 20. Frame members 56 and 57 interconnect the upper ends of said ramp frame members 50 and 52. Finally the upper ends of ramp frame members 50 and 52 are connected to frame 20 by generally vertical pieces 58 and 59, thus completing the framing for the entrances 44 and 45. Netting or coarse mesh 54 is secured to and stretched over the various frame members to completely enclose the trap. The netting 54 which may preferably be cotton netting or chicken wire, also forms the ramp surface and the side walls of the ramp, that is, for example, between frame members 14, 22, 52 and 58 to further guide the crabs up the ramps toward the entrances.

Figure 12:
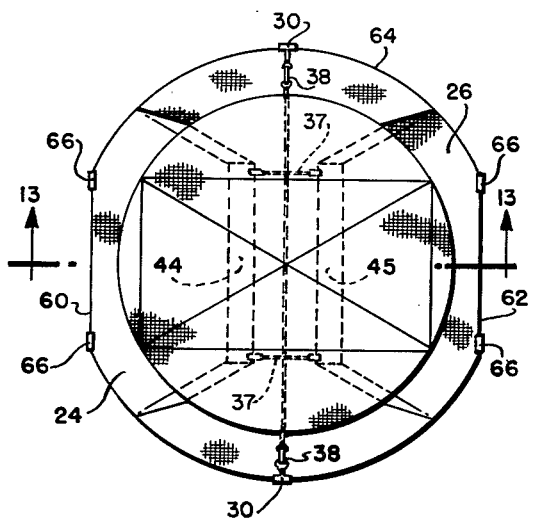
FIGURE 12 is a bottom plan view of the modified form of trap shown in FIGURE 7 employing the flexible mounted opening frame of FIGURES 8 and 9, so as to better illustrate the relationship between the hinged doors and the entrance openings which are shown in dotted lines for the sake of clarity and because they would normally be hidden by the covering of the trap.
Figure 13:
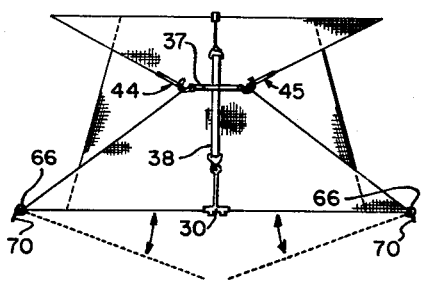
FIGURE 13 is a diagrammatic view showing the relationship between the two entrance opening frames, the resilient ties between them and the resilient means used to secure the doors in closed position.
Figure 14:
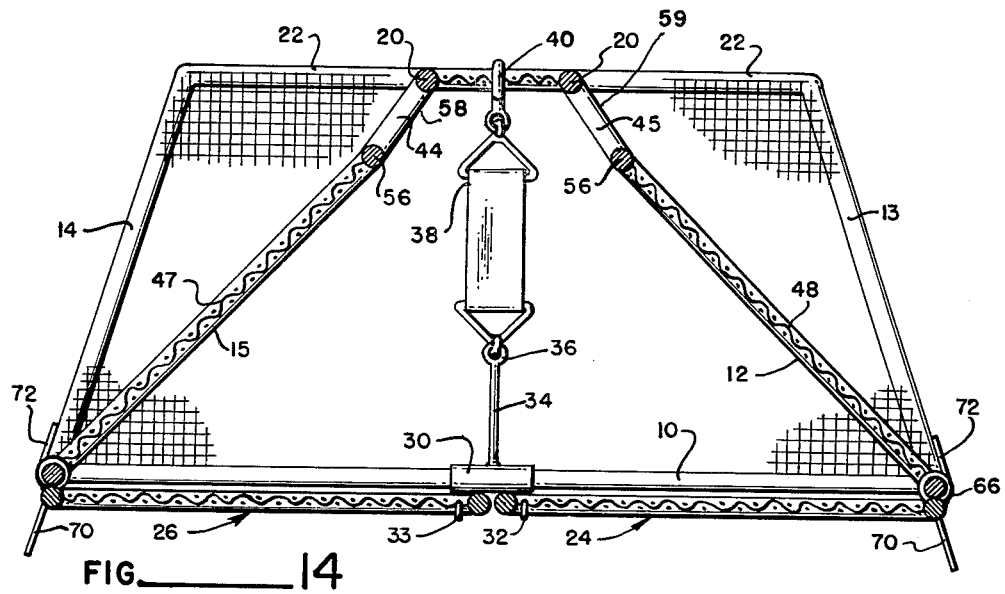
FIGURE 14 is a section, in elevation, and on an increased scale taken along the line 14—14 of FIGURE 2.
Figure 15:
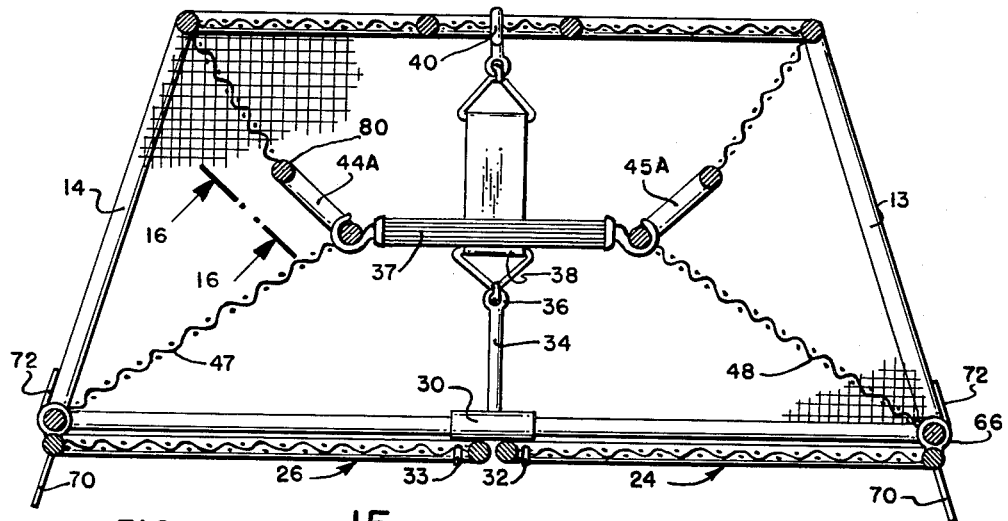
FIGURE 15 is a section in elevation, and on an increased scale taken along the line 15—15 of FIGURE 9.
Figure 16:
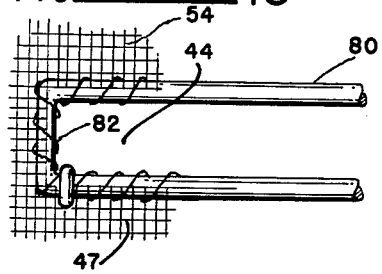
FIGURE 16 is a fragmentary view of the end of an entrance opening into a crab trap and illustrating one means of securing the netting to the frame members.

FIGURES 7 and 12 illustrate a form in which, instead of the square corners used in the other forms of the trap, the floor and top are circles except that the floor has two cord-like portions 60 and 62 so that the bottom doors may be hinged thereto and operate substantially as previously described. In order to show the similarity in function and in general shape of the various parts of the modified forms as compared to the rectangular form, the same reference characters have been used on the similar portions. An exception is made of the curved portions which have been given separate reference characters as the outer circle representing the margin of the floor or bottom of the trap is indicated at 64 and the top margin by the circle 67. It will be noted in FIGURE 10 that the hinges 66 for the doors must of necessity be closer together than in the rectangular form.

FIGURES 8, 12, 13, 15 and 16 illustrate one form of frame which is suitable for an alternative embodiment. The basic frame is the same as that just described. However, the alternative embodiment employs a floating type entrance opening frame 80. The netting 54 may be secured to framework 80 by wire or twine 82 as shown best in FIGURE 16. The entrance opening frames 44 and 45 in addition to being fixedly secured to the main frame, may be flexibly supported as at 44A and 44B. Entrance frame 80 is preferably made of the same material as the main frame. In order that slack in the netting be taken up it is desirable to connect the floating entrance openings by resilient or stretchable members 37 which hook to each floating entrance frame 44A or 45A and force them together. In this way the netting 54 is pulled taut giving a clearly defined rampway approach to the openings. These floating type entrances give the trap a certain amount of ability to sway or move with currents.

Figure 11:
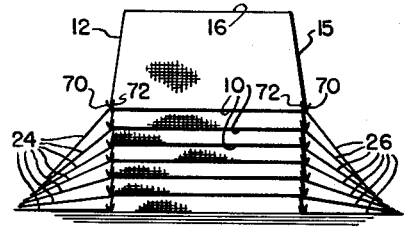
FIGURE 11 is a side elevation showing a number of the crab traps stacked or nested together and showing the relative position of the doors and the anti-walking anchors.

In either embodiment, whether rigid type on the one hand or flexible or floating type on the other, the traps can be very conveniently nested (see FIGURE 11) one inside the other by merely opening the bottom doors and piling. Thus, a minimum of storage space is required.

Figure 10:
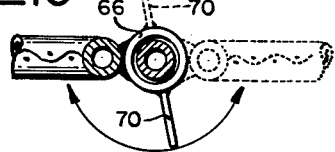
FIGURE 10 is a fragmentary view, partly in section showing the anti-walking anchor or spade means in the retracted position as when the doors are open, shown in dotted lines, and the normal position of use being shown in solid lines.

FIGURE 10 illustrates an additional feature of this invention in which each of the bottom doors on the hinged side is provided with a short length of rigid material, i.e. metal, secured to the door frame as by welding. These short lengths of metal 70 and 72 form anti-walking anchors when the trap is in the water and the doors are closed, and also comprise anti-jamming nesting stops when the doors are open and the traps nested on deck. The anti-jamming feature prevents binding of the doors when the traps are stored. Such anchors 70 and 72 are preferably about six inches long and disposed randomly along the length of the hinged side of the door frame.

It should and will be understood by those skilled in the art that the dimensions of the various portions of the traps, whether round, rectangular, square or any other configuration, need not be precisely determined. It is further contemplated that the entrance could be substantially shorter and higher, though those shown are considered best.

It is believed that it will be clearly apparent from the above description and the disclosure in the drawings that the invention comprehends a novel construction of a crab trap.

What is claimed is:

1. A crab trap, comprising: a main frame structure having a bottom portion and a top portion in generally parallel spaced apart relation to said bottom portion in which said top portion is of lesser size than said bottom portion, and in which the top and bottom portions of said frame are rigidly interconnected by connecting frame members; ramp frame structures on opposed sides of said main frame leading from said bottom portion upwardly and inwardly and terminating in spaced relation to each other and below said top portion to define elongated entrance openings between the upper terminal ends of said ramps and said top portions; hinged door means for opening the bottom of said trap and coming together when closed; manually releasable locking means for said doors including resilient restraining means for holding said locking means in locked position; netting means covering all of said frame, doors and ramps, said elongated entrance openings being unobstructed to permit entry of crabs into said trap; said locking means having tubular pivot means with an upwardly extending handle means rotatably mounted on said bottom portion and located in close proximity to the point where said doors come together when closed; a pair of spaced apart hook means secured to and curving downwardly and outwardly from said tubular pivot means, one each of said hooks engaging and holding a door closed when said handle is swung inwardly towards the trap and said hooks releasing said door when said handle is swung outwardly away from said trap; and said resilient restrainng means being attached to said top frame portion and to said handle to hold said handle inwardly and to thus hold said hooks in engagement with said doors.

2. A crab trap, comprising: a main frame structure having a bottom peripheral portion and a smaller top peripheral portion in generally parallel spaced apart relation to said bottom portion, said top and bottom portions being rigidly interconnected by first connecting frame means; ramp frame structures on opposed sides of said peripheral frame leading from said bottom peripheral portion upwardly and inwardly and the upper ends thereof terminating in spaced relationship to each other and in spaced relation to and below said top frame portion, the upper ends of each of said ramp frame structures being interconnected by horizontal frame members and supported from said top portion by second connecting frame means, said horizontal and second connecting frame means together with said top frame portion defining elongated trap entrance openings at the upper ends of said ramp frame structures; hinged door means for opening and closing the bottom of said trap and coming together when closed; manually releasable locking means for said doors including resilient restraining means for holding said locking means in locked position; netting means covering all of said frame, doors and ramp structures and thereby defining side walls for said ramp structures; said elongated entrance openings being unobstructed to permit entry of crabs into said trap; said locking means having tubular pivot means with an upwardly extending handle means rotatably mounted on said bottom portion and located in close proximity to the point where said doors come together when closed; a pair of spaced apart hook means secured to and curving downwardly and outwardly from said tubular pivot means, one each of said hooks engaging and holding a door closed when said handle is swung inwardly towards the trap, and said hooks releasing said door when said handle is swung outwardly away from said trap; and said resilient restraining means being attached to said top frame portion and to said handle to hold said handle inwardly and to thus hold said hooks in engagement with said doors.

3. A crab trap, comprising: a main frame structure having a bottom peripheral portion and a smaller top peripheral portion in generally parallel spaced-apart relation to said bottom portion, said top and bottom portions being rigidly interconnected by a plurality of first connecting frame means, said plurality of first frame means extending generally inwardly and upwardly at a uniform angle to the vertical from said bottom portion; a pair of ramp frame structures each of which is located generally opposite the other and which extend upwardly and inwardly from said bottom portion, the upper ends of said ramp frame structures terminating in spaced relation to each other and also generally below and in spaced relation to said top portion, said upper ends of said ramp structures and said top portion defining a pair of opposed generally rectangular entrance openings; a pair of door means hinged to and coming together at a point on said bottom portion and together opening and closing the bottom of said trap; manually releasable locking means for said doors including resilient restraining means for holding said locking means in locked position; netting means covering all of said frame, doors, and ramp structures to thereby define ramp approaches and side walls for said ramp structures; said entrance openings being unobstructed to permit entry into said trap of crabs approaching by said ramp and guided by said side walls; said locking means having tubular pivot means with an upwardly extending handle means rotatably mounted on said bottom portion and located in close proximity to the point where said doors come together when closed; a pair of spaced apart hook means secured to and curving downwardly and outwardly from said tubular pivot means, one each of said hooks engaging and holding a door closed when said handle is swung inwardly towards the trap and said books releasing said door when said handle is swung outwardly away from said trap; and said resilient restraining means being attached to said top frame portion and to said handle to hold said handle inwardly and to thus hold said hooks in engagement with said doors.

4. A crab trap, comprising: a rigid main frame structure having a bottom portion and a smaller top portion in generally parallel, spaced apart relation to said bottom portion, said top and bottom portions being rigidly interconnected by connecting frame means; doors hinged to and coming together at a point on said bottom portion and together opening and closing the bottom of said trap; netting means covering all of said frame and said doors, said netting being substantially slack on two generally opposed sides of said main frame structure; a rigid unobstructed entrance frame means located in and attached to said netting on each of said slack sides between said top and bottom portions, said entrance frame means being interconnected by detachable resilient connecting means within said trap to draw said entrance openings toward each other to tighten said netting means and to thereby define ramp structures leading from opposed sides of said bottom portion to said entrance openings; manually releasable locking means for said doors including resilient restraining means for holding said locking means in locked position; said locking means having tubular pivot means with an upwardly extending handle means rotatably mounted on said bottom portion and located in close proximity to the point where said doors come together when closed; a pair of spaced apart hook means secured to and curving downwardly and outwardly from said tubular pivot means, one each of said hooks engaging and holding a door closed when said handle is swung inwardly towards the trap and said hooks releasing said door when said handle is swung outwardly away from said trap; and said resilient restraining means being attached to said top frame portion and to said handle to hold said handle inwardly and to thus hold said hooks in engagement with said doors.

5. A crab trap, comprising: a rigid main frame structure having a bottom portion and a smaller top portion in generally parallel spaced apart relation to said bottom portion, said top and bottom portions being rigidly interconnected by connecting frame means; a pair of doors hinged to and coming together at a point on opposed sides of said bottom portion and together opening and closing the bottom of said trap; netting means covering all of said frame structure and said doors to define a fully enclosed trap, said netting being substantially slack on the two sides of said principal structure corresponding to the sides to which said doors are hinged; a pair of unobstructed rigid entrance frame means, one each of which is located in and attached to said netting on a slack side between said top and bottom portions, said pair of entrance frame means being interconnected one with the other by detachable resilient connecting means within said enclosed trap to draw said entrance openings toward each other and to hold them in spaced relation to each other and to tighten said slack netting to thereby define ramp structures leading from opposed sides of said bottom portion to said entrance openings; manually releasable locking means for said doors including resilient restraining means for holding said locking means in locked position; said locking means having tubular pivot means with an upwardly extending handle means rotatably mounted on said bottom portion and located in close proximity to the point where said doors come together when closed; a pair of spaced apart hook means secured to and curving downwardly and outwardly from said tubular pivot means, one each of said hooks engaging and holding a door closed when said handle is swung inwardly towards the trap and said hooks releasing said door when said handle is swung outwardly away from said trap; and said resilient restraining means being attached to said top frame portion and to said handle to hold said handle inwardly and to thus hold said hooks in engagement with said doors.

6. A crab trap, comprising: a rigid main frame structure having a bottom frame portion and a smaller top portion disposed in generally parallel, spaced apart relation to said bottom portion, said top and bottom portions being rigidly interconnected by connecting frame means; door means hinged to and coming together at a point on opposed sides of said bottom portion and together opening and closing the bottom of said trap; netting means covering all of said main frame structure and said doors to define a fully enclosed trap; unobstructed entrance frame means located between said top and bottom portions on opposed sides of said main frame structure and also attached to said netting means; ramp means on said netting extending from opposed sides of said bottom portion upwardly and inwardly and terminating at said entrance frame means; manually releasable locking means for said doors including resilient restraining means for holding said locking means in locked position; said locking means having tubular pivot means with an upwardly extending handle means rotatably mounted on said bottom portion and located in close proximity to the point where said doors come together when closed; a pair of spaced apart hook means secured to and curving downwardly and outwardly from said tubular pivot means, one each of said hooks engaging and holding a door closed when said handle is swung inwardly towards the trap and said hooks releasing said door when said handle is swung outwardly away from said trap; and said resilient restraining means being attached to said top frame portion and to said handle to hold said handle inwardly and to thus hold said hooks in engagement with said doors.

7. A crab trap, comprising: a rigid main frame structure having a bottom frame portion and a smaller top portion disposed in generally parallel, spaced apart relation to said bottom portion, said top and bottom portions being rigidly interconnected by a plurality of connecting frame means all of which extend inwardly from said bottom portion at a substantially uniform angle from the vertical so as to define a trap generally in the form of a truncated solid; a pair of door frame means hinged to and coming together at a point on opposed sides of said bottom portion and together opening and closing the bottom of said trap, said door frames being of approximately equal size; netting means covering all of said main frame structure and said doors to define a fully enclosed trap; a pair of unobstructed entrance frame means each of which is located between said top and bottom portions and spaced inwardly from opposed sides of said main frame structure and also attached to said netting means; a pair of ramp means formed by said netting each extending from said bottom portion on each of said opposed sides inwardly and upwardly and terminating at said entrance frame means; manually releasable locking means for said doors including resilient restraining means for holding said locking means in locked position; said locking means having tubular pivot means with an upwardly extending handle means rotatably mounted on said bottom portion and located in close proximity to the point where said doors come together when closed; a pair of spaced apart hook means secured to and curving downwardly and outwardly from said tubular pivot means, one each of said hooks engaging and holding a door closed when said handle is swung inwardly towards the trap and said hooks releasing said door when said handle is swung outwardly away from said trap; and said resilient restraining means being attached to said top frame portion and to said handle to hold said handle inwardly and to thus hold said hooks in engagement with said doors.

References Cited by the Examiner

UNITED STATES PATENTS

| 2,760,297 | 8/56 | Buyken | 43—105 |
| 3,045,386 | 7/62 | Coyne | 43—100 |

FOREIGN PATENTS

| 1,559 | 4/80 | Great Britain. |

SAMUEL KOREN, *Primary Examiner.*

ABRAHAM G. STONE, *Examiner.*